United States Patent [19]

Barsellotti

[11] Patent Number: 4,608,686
[45] Date of Patent: Aug. 26, 1986

[54] TWO WIRE VOICE AND DATA SUBSCRIBER LOOP

[75] Inventor: John A. Barsellotti, Kanata, Canada

[73] Assignee: Mitel Corporation, Ontario, Canada

[21] Appl. No.: 422,188

[22] Filed: Sep. 23, 1982

[30] Foreign Application Priority Data

Feb. 22, 1982 [CA] Canada .................................. 396694

[51] Int. Cl.$^4$ ........................... H04J 1/00; H04J 1/14; H04M 11/00
[52] U.S. Cl. .................................... 370/69.1; 370/76; 179/2 DP
[58] Field of Search .............. 370/69.1, 76; 179/2 DP

[56] References Cited

U.S. PATENT DOCUMENTS

| | | | |
|---|---|---|---|
| 3,701,851 | 10/1972 | Starret | 370/76 |
| 3,718,767 | 2/1973 | Ellis | 370/76 |
| 3,824,347 | 7/1974 | Sorber et al. | 370/76 |
| 3,875,339 | 4/1975 | Gruen et al. | 370/76 |
| 3,932,709 | 1/1976 | Hoff et al. | 179/2 DP |
| 3,937,882 | 2/1976 | Bingham | 179/2 DP |
| 3,937,889 | 2/1976 | Bell, III et al. | 179/2 DP |
| 4,101,834 | 7/1978 | Stutt et al. | 370/69.1 |
| 4,291,200 | 9/1981 | Smith | 179/2 DP |
| 4,306,116 | 12/1981 | McClure et al. | 179/2 DP |
| 4,330,687 | 5/1982 | Foulkes et al. | 370/69.1 |
| 4,330,886 | 5/1982 | Fukuda et al. | 779/2 DP |
| 4,335,464 | 6/1982 | Armstrong | 370/69.1 |
| 4,379,947 | 4/1983 | Warner | 370/76 |
| 4,387,271 | 6/1983 | Artom | 179/2 DP |
| 4,418,416 | 11/1983 | Lese et al. | 179/2 DP |
| 4,421,951 | 12/1983 | Van Bosse | 179/2 DP |

FOREIGN PATENT DOCUMENTS

| | | | |
|---|---|---|---|
| 0148433 | 5/1981 | Fed. Rep. of Germany | 370/69.1 |
| 0786014 | 12/1980 | U.S.S.R. | 370/69.1 |

OTHER PUBLICATIONS

C. McProud, "15 Channels on One Pair of Wires", Audio, May 1970, pp. 20-23.
H. Koga et al., "108 kbit/s Multilevel Data Transmission on Basic Group Band", NEC Res. & Dev., No. 34, Jul. 1974, pp. 57-61.
S. Mitsui et al., "Digital Signal Transmission Over FDM Systems Using DIV/DUV", Intelcon 79, Feb. & Mar. 1979, pp. 583-588.

Primary Examiner—Douglas W. Olms
Assistant Examiner—Wellington Chin
Attorney, Agent, or Firm—Antonelli, Terry & Wands

[57] ABSTRACT

A circuit for transmitting both voice and data at the same time between a subscriber's set and a switching exchange via a bidirectional two wire link. The invention is comprised of a subscriber's set adapted to generate and receive baseband voice signals and data signals, a circuit for 100% amplitude modulating the generated data signal on a carrier signal having its lowest sideband after filtering above the voice signal base band, a circuit for applying the voice signals and modulated carrier to a two-wire subscriber's line, a circuit for separating the voice signals and modulated carrier, and a circuit for demodulating the digital signal and applying the digital signal to control circuits of a switching exchange. Voice signals are applied to voice handling circuits such as the voice switching circuits of the switching machine.

27 Claims, 11 Drawing Figures

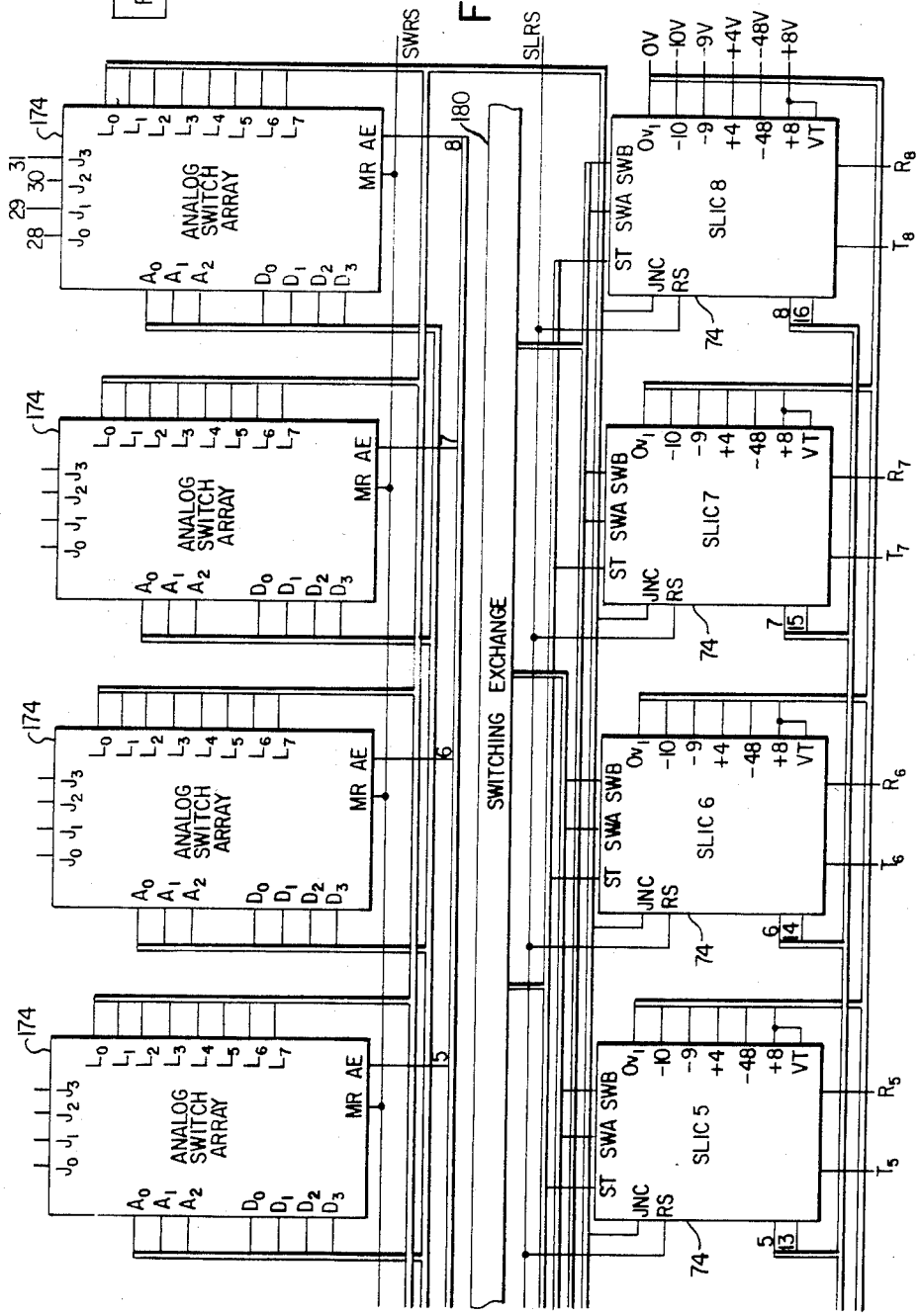

TWO WIRE VOICE AND DATA SUBSCRIBER LOOP

This invention relates to a telephone system, and particularly to a telephone set and a transmission system connected between the telephone set and a PABX for carrying combined voice and data via a bidirectional two wire link.

The subscriber loop which interfaces telephone switching machines have traditionally been formed of three wires, referred to as tip, ring and sleeve, and in some cases a fourth wire constituting a ground lead is used. For private line service, however, two wires have been used to carry all of the well known telephone signals: analog voice signals, ringing signals, state indication signals such as busy tone and dial tone, multi-frequency dialling tones or rotary dial pulses, and direct current to power the telephone set. For multi-line systems which appear on a single telephone set, such as a six button key set, the two wires are duplicated by the number of lines, and an additional pair of wires carries ringing signals. Clearly the bundle of wires or cable which connects this form of telephone set with the telephone switching equipment is costly, thick, and difficult to manage and connect.

More recently, it was realized that since a telephone set can only be used for one conversation at a time, only one pair of wires (a single telephone line) is required from a multi-line telephone set to carry the voice signal to the single switching equipment. Digital command signals generated at the telephone line would be used to cause the switching equipment to apply only one telephone signal to the telephone set at a time, or to enable operation of illuminated indicators, such as numeric displays, at the telephone set. Consequently in addition to carrying the well known signals noted earlier, a digital transmission facility between the telephone set and the switching machine is required. Thus because of interference between the signals (e.g. digital switching noise) more than two wires were required to transmit voice, data and the other signals or their equivalent between the switching machine and telephone set.

For example, in one prior art system of the latter type, two voice pairs are used. Line power is multiplexed with the voice in the normal way, but data is transmitted over a phantom circuit. Consequently at least three wires are needed.

In another prior art system, both digital data and voice signals were transmitted over the subscriber loop through the PABX switching crosspoints. However this required transmitting the data in a frequency band below 4 kilohertz. The two types of signals did not actually share the lines at the same time, since the voice signals would interfere with the data signals and the data signals would interfere with the voice signals, making both unintelligible during simultaneous transmission. Consequently the voice and data were separated by time, and there was no actual simultaneous use of the lines.

According to another prior art proposal, specialized modulation schemes are used, such as Walsh functions which attempt to encapsulate or otherwise separate the data signal from the voice signal. However such cases were generally unsuccessful since too many sideband signal components were either close to or within the voice band, causing interference with the voice band and making it difficult or impossible to secure the data with integrity.

There are many problems involved in transmitting digital data signals and voice signals at the same time on a bi-directional two-wire subscriber's line. Sending the data signals at a high frequency results in radiation from the lines which is prohibited by Government regulatory bodies, since it causes interference with other apparatus and can cause interference between adjacent subscriber's lines. The characteristic of the two-wire subcriber's line which creates via losses, reflection signals, etc. also dictates transmission at the lowest possible frequency, to minimize such problems. Yet transmission of data signals at low frequency results in interference with the voiceband. Transmission at a frequency close to the voiceband also results in substantially increased costs of the equipment. For example multistage, sharp cut-off and critically adjusted filters, etc., are required. Further, frequency shift keyed data signals could not be switched noiselessly, causing interference with the voice signal.

Since there is a greater variation in the charactistics of subscriber's lines, it is essential that the separation and recovery apparatus should be as simple and universally applicable as possible, yet which should work reliably. The present invention is a combined voice and data two-wire bidirectional transmission system for use between a subscriber's set and a PABX which can be used for transmission of voice and data at the same time. Consequently a single telephone set can be used to access a plurality of line ports at a PABX via a two wire line, and at the same time as a voice conversation is being carried on, the PABX can transmit digital data signals to the telephone set or digital data command signals can be generated at the telephone set and be transmitted to the PABX to cause various special features to be implemented such as conferencing, etc.

In th present invention, digital data signals are not transmitted through the switching network, as they will be dealt with by the PABX microprocessor directly. If the data signals were transmitted at a high bit rate, the radiation, interference, and signal deterioration problems described above would occur. According to the present invention, the data signals are transmitted at a relatively low bit rate, and 100% modulate are carrier signal which is substantially removed in frequency from the upper limit of the voice band, yet is low enough in frequency so as not to be substantially radiated from the subscriber's line or be seriously deteriorated during transmission. Indeed, the change in the data signal wave form which has been observed following transmission results in a signal which is easily recovered using inexpensive techniques described in this specification.

The data signals received from the telephone set are thus demodulated at the PABX, are converted into parallel form, and are applied to the main bus system of the PABX. In the case of a PABX which does not use a microprocessor, the data signals which are demodulated and are not applied to the switching matrix of the PABX can be used by other control circuitry within the PABX, according to the design of the PABX.

At the PABX, the transmission path which carries the voice and data signals from the telephone set is filtered to pass the baseband voice, and to cut off the data signal. This effectively defines the bandwidth of the voice switching matrix from the point of view of the subscribers' lines.

At the telephone set, the data signal from the PABX is demodulated and is applied to a control circuit, such as a local microprocessor circuit. The voice signal is applied to the telephone handset earpiece. During transmission (or reception) of data signals, the control circuit can apply a control signal to a switch in series with the earpiece, to cut off loudspeaker acoustic reproduction of the signals applied thereto during non-handsfree operation.

The use of amplitude modulated carrier has further advantage in that it can be switched noiselessly.

In general, therefore, the invention is a combined voice and data transmission system for subscriber's set comprising a subscriber's set adapted to generate and receive baseband voice signals and data signals, a circuit for 100% amplitude modulating the generated data signal on a carrier signal having its lowest sideband after filtering above the voice signal base band, a circuit for applying the voice signals and modulated carrier to a two-wire subscriber's line, a circuit for separating the voice signals and modulated carrier, and a circuit for demodulating the digital signal and applying the digital signal to control circuits of a switching exchange. Voice signals applied to voice handling circuits such as the voice switching circuits of the switching machine.

More particularly, the invention is a combined simultaneous voice and data transmission system comprising a telephone switching exchange including a voice switching circuit and a bus system to which a switching exchange controller is connected, the voice switching circuit having a voiceband frequency transmission bandwidth, a subscriber's set for generating voiceband analog signals for transmission to the switching machine, a circuit associated with the subscriber's set for generating serial digital signals for transmission to the switching machine, and a two wire subscriber's line interconnecting the subscriber's set and the switching machine. A circuit is provided for 100% amplitude modulating the carrier signal with the digital signals, the carrier signals having a frequency higher than the upper limit of the voiceband bandwidth and at least twice the higher frequency of the analog signals. A further circuit combines the modulated digital signals and the analog signals and applies them to one end of the two wire subscriber's line. At the other end of the subscriber's line a circuit is provided for receiving the combined signals, filtering and demodulating the serial digital signals, for reconstructing the digital signals and applying them to the bus system, and for applying the analog signals to the voice switching circuit.

The invention is also a subscriber's set including a circuit for generating audio frequency analog signals for transmission via a two-wire subscriber's line to a switching exchange which has a defined audio frequency bandwidth, a circuit for generating serial digital signals for transmission via the two-wire line to the switching exchange, a circuit for 100% amplitude modulating the digital signals on a first carrier signal having a frequency higher than the upper limit of the defined bandwidth, and at least twice the highest frequency of the analog signals, and a circuit for combining the modulated digital signals and the analog signals and applying them to the subscriber's line.

The invention is also a method for transmitting voice and data signals simultaneously over a bidirectional two-wire subscriber's line comprising 100% amplitude modulating serial digital signal on a carrier signal which has a frequency at least twice the highest frequency of the voice signal, adding the voice signal and the modulated digital signal, and applying the combined signal to one end of the subscriber's line for reception, demodulation and separation at another end of the subscriber's line.

It should be noted that in this specification, where it is stated that the switching exchange has a defined audio frequency transmission bandwidth, it is intended that the upper frequency of the transmission bandwidth may be defined by one or more filters which also serve to pass the voice signals received from the subscriber's line into the voice signal handling circuit of the switching exchange. The highest audio frequency bandwidth frequency is sufficiently below the carrier frequency of the digital signal that sideband components of the modulated carrier do not appear in any significance within the audio frequency voice band. Since the present invention can be used with a wide variety of switching exchanges, which may have considerably different frequency transmission characteristics from input port to output port, the transmission bandwidth is intended to be controlled by a filter which forms the aforenoted bandwidth definition for the voice signals originating at the subscriber's set, when applied to the switching exchange voice signal switching circuitry.

A better understanding of the invention will be obtained by reference to the detailed description below, in conjunction with the following drawings, in which.

Figure 4:
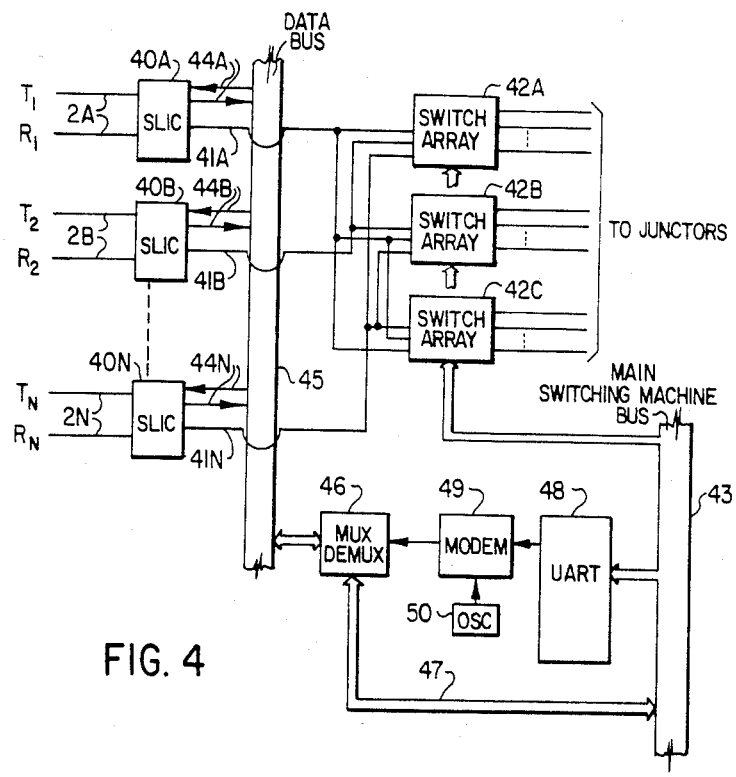
Figure 5:
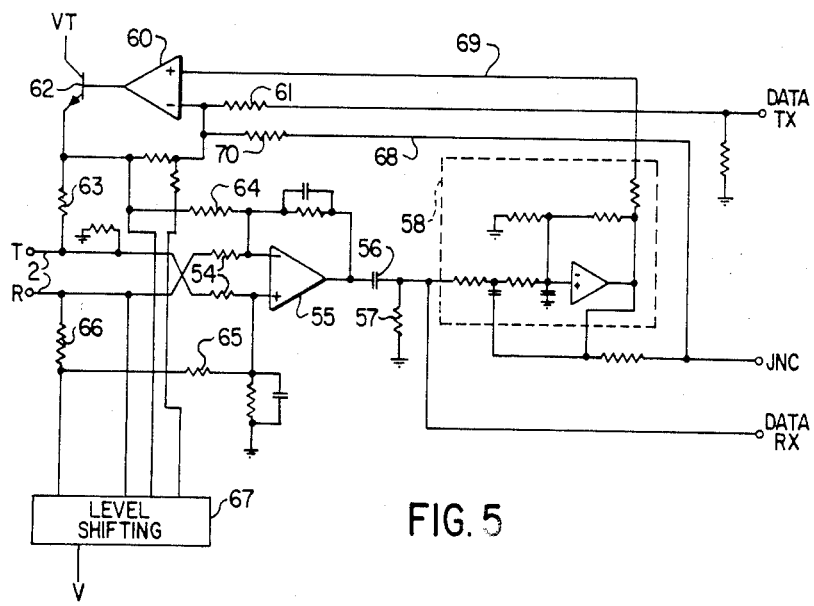
Figure 6A:
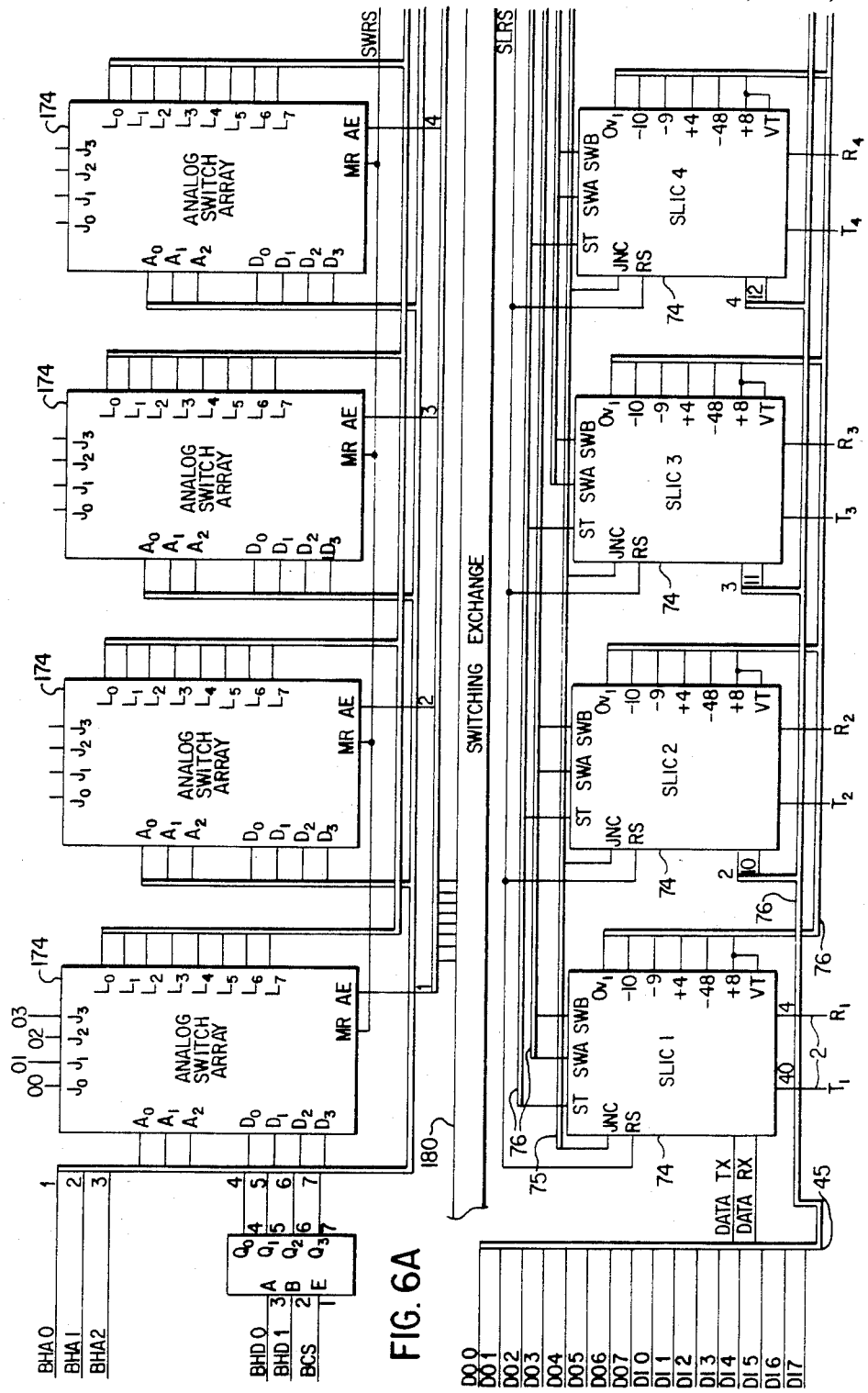
Figure 7:
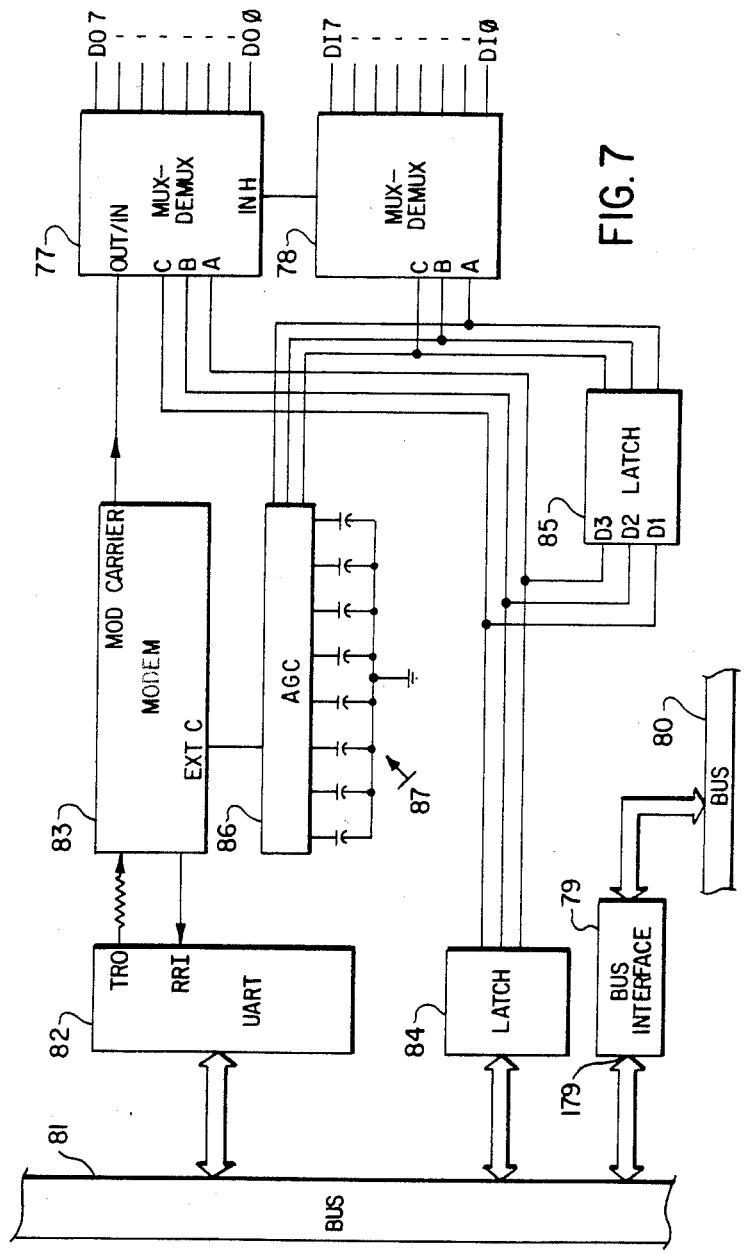
Figure 8:
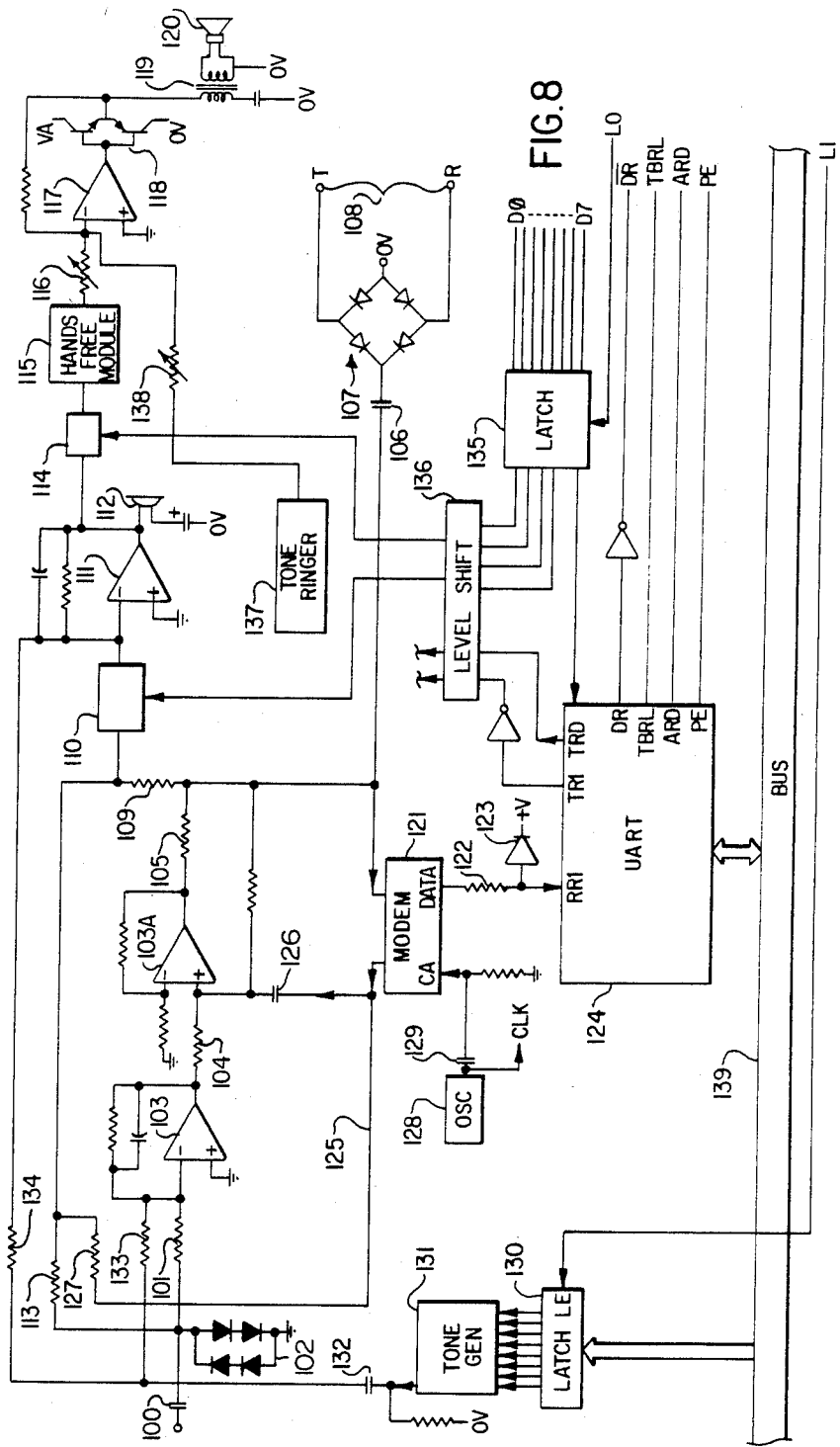
Figure 9:
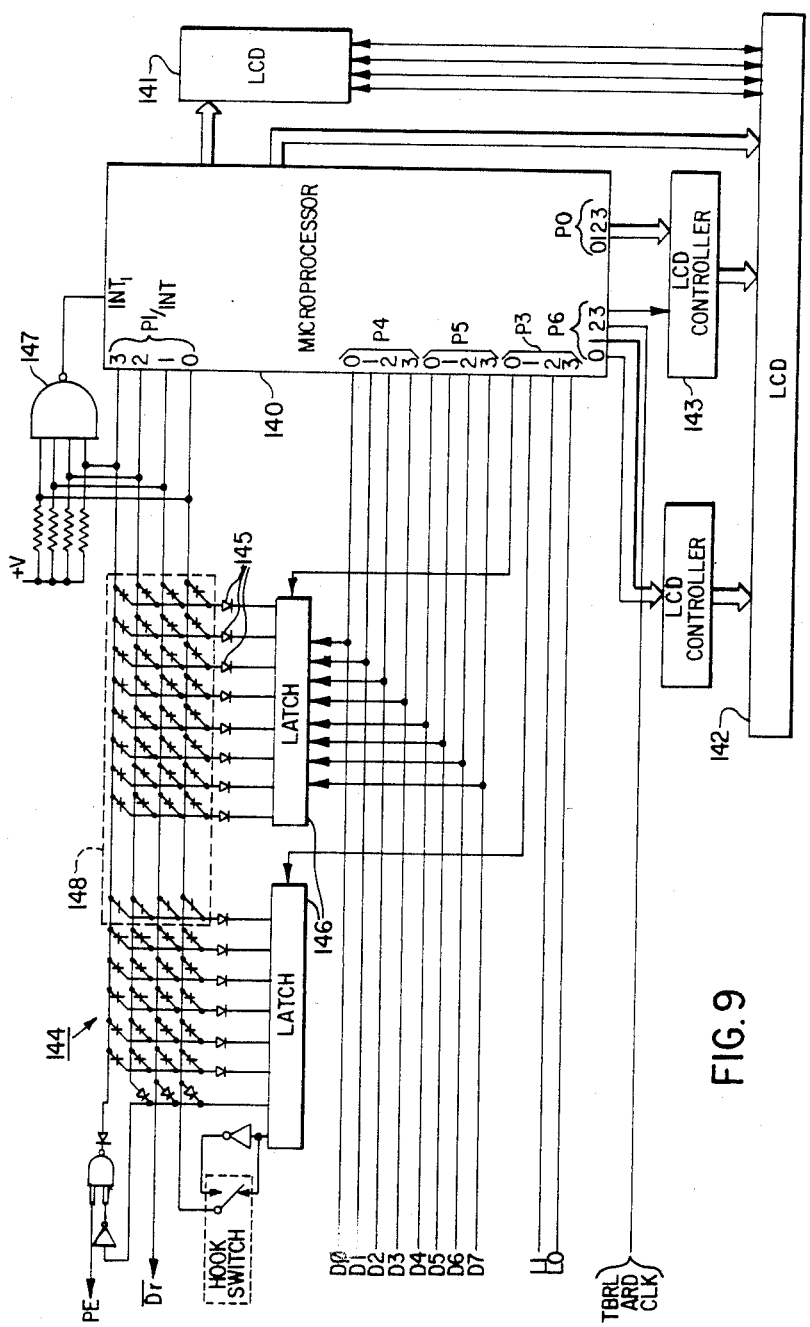

FIG. 4 is a block schematic of the portion of the present invention used to interface with a processor controlled PABX or other switching exchange, FIG. 5 is a schematic of a subscriber line interface circuit preferred to be used with a PABX or switching exchange, FIGS. 6A-C and 7 are schematics of PABX or switching exchange interface circuitry, and FIGS. 8 and 9 are schematics of a combined voice and data telephone set.

Figure 1:
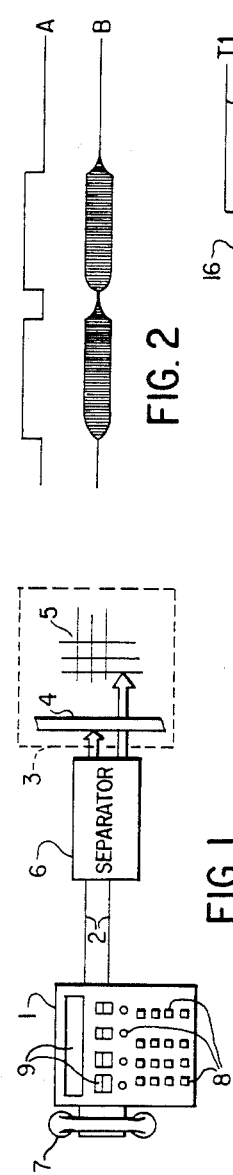
FIG. 1 is a general block diagram of the system of the invention.

Turning to FIG. 1, a system incorporating the present invention is shown A combined voice and data telephone set 1 is connected via a two wire (tip and ring) line 2 to a switching exchange 3, such as a PABX. The switching machine is the type which is processor controlled, and includes a bus system 4 and a voice switching matrix 5 (which can be of any common form, such as analog or PCM type). A voice and digital data signal separator 6 interfaces between the two wire line 2 and the bus system and the voice switching matrix.

The voice and data telephone set 1 is of the type which includes a handset 7, a group of push-buttons 8 which operate swtiches for generating dialing and command code signals, and one or a plurality of displays 9 which display messages, time, dialed numbers push-button labels, etc. The telephone set also provides to the subscriber the utility of a plurality of separate lines which can be accessed by pushing predetermined ones of the push-buttons. This facility can be provided by using the processor at the switching machine 3 to connect or hold lines which are to be accessed by the telephone set, to give access to any of the lines requested from the telephone set, to download digital data signals to the telephone set which causes push-button label designations to change, various messages to appear on the display, etc.

It has been determined that only one voice grade pair of wires is necessary to provide the voice communication link between the telephone set and switching machine, even if a call is being conferenced with one or a plurality of other lines, since the conferencing circuitry can all be provided at the switching machine 3, and more than one voice line need not be connected between the switching machine and telephone set. However there is a need for a data link between the switching machine and telephone set. As noted earlier, prior art systems utilize, for example two voice pairs, multiplexing power with the voice lines, and transmitting data over a phantom pair (thus requiring at least three wires, a non-standard transmission facility). According to the present invention, both voice and data signals are transmitted down the same bi-directional pair of wires.

The present invention is made feasible by removing the data signal from the two-wire pair at the switching exchange and applying it to the bus system of the switching machine. This allows the present invention to completely intermix the voice and data signals carried by the two-wire line. The data signals modulates a carrier signal at a frequency outside the voiceband in a NRZ format, allowing the data signal to be recovered with reliability and without the digital signal or sidebands of the modulated signals interfering with the voice signal. Since the data is removed prior to entry of the transmitted signal into the voice switching matrix of the switching machine, the present invention can use a relatively high frequency carrier signal, typically about 32 kilohertz, to carry the digital data. Should signals modulated on this carrier be passed through the switching exchange voice switching matrix, crosstalk would usually result in analog sytsems or interference, errors and unreliable transmission in the case of PCM switching.

Further, with the carrier being at a relatively high frequency relative to the voice baseband (e.g. 4 kilohertz) it is very easily filtered with inexpensive components, while providing very low or undetectable sideband energy in the voice baseband.

The present invention thus allows the provision of a two-wire data and voice communication link between the switching machine and voice and data telephone set which uses only two wires, is reliable, and is relatively inexpensive.

Figure 2:
FIG. 2 depicts the digital signal waveforms preferably used in this invention.

FIG. 2 shows a waveform A which is reprsentative of a data signal to be transmitted between the telephone set and switching machine, in either direction. After modulation on a 32 Khz carrier and filtering to reduce the bandwidth, waveform B shows the resulting NRZ form of signal which as it is applied to the two-wire line. It is preferred that 16 NRZ carrier pulses should represent a "1" data pulse, for reliability.

Since the present invention modulates the data pulse on a carrier, which has a center frequency at least twice as high as the highest frequency of the voice baseband, a slower data rate can be tolerated than in prior art systems which required high bandwidth, allowing easier recovery of the carrier envelope.

It is preferred that each message should contain 11 bits followed by two stop bits and a parity bit, each bit being 16 cycles (500 microseconds) of the 32 KHz carrier. Following transmission of a message, a response message (handshaking) should be returned from the receiving entity, the switching machine or telephone set.

Figure 3:
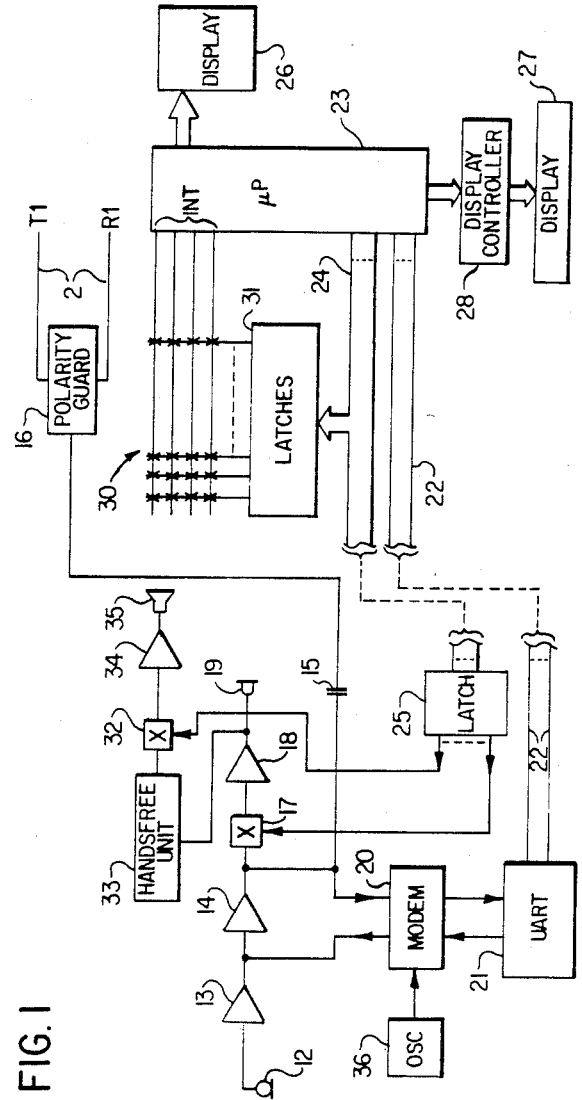
FIG. 3 is a block schematic of the subscriber's set portion of this invention.

FIG. 3 is a block diagram of the voice and data telephone set used in the present invention. A handset microphone 12 receives voice signals from a subscriber and applies corresponding analog voice signals through a buffer amplifier 13 and impedance matching amplifier 14 connected in series, from the output of which the voice signals are applied via DC blocking capacitor 15 and a polarity guard 16 to tip and ring leads (subscriber line) 2. The voice signals from microphone 12 are also applied through switch 17 to receive amplifier 18, from which it is applied to an acoustic receiving transducer (handset earpiece) 19. Sidetone of the voice signal entering microphone 12 can thus be heard by the subscriber in earpiece 19.

Voice signals received by the telephone set from line 2 pass through polarity guard 16, through capacitor 15, switch 17 and receive amplifier 18 and are heard in receiver 19 by subscriber.

Data signals received from line 2, pass through polarity guard 16 and capacitor 15 and are applied to MODEM 20 (with the voice signals) MODEM 20 demodulates the data signals and applies them to univeral asynchronous receiver-transmitter (UART) 21. The signals from UART 21 are carried on bus 22 to a microprocessor 23. Microprocessor 23 as a result outputs signals to a display 26 or to a display 27 via a display controller 28. In this manner messages or key (switch) indicator labels can be displayed at the telephone set.

The voice and data telephone set also generates data signals. A switch matrix 30 is connected to microprocessor 23 on its interrupt line inputs, and also to data bus 24 via latches 31. Accordingly when a switch matrix push-button is closed, upon being addressed via bus 24 (scanned) microprocessor 23 determines which switch has been closed by an interrupt being generated. A data signal is correspondingly formulated by the microprocessor. The data signal can be one of two types, either for outward transmission or for local control. In the case of local control, the data signal is applied in parallel to bus 24 and is held in latch 25. As an example of an use of this signal, if the switch which was closed was intended to cause the voice and data telephone set to go into its loudspeaking mode, an enable signal from latch 25 is applied to the enable input of a switch 32 which is in the transmission path of an amplifying circuit leading from the output of amplifier 18, through a hands free voice switching unit 33 (if used), a loudspeaking amplifier 34 and loudspeaker 35. Thus the signal applied to switch 32 either enables or inhibits voice signals passing through amplifer 18 to be reproduced at room loudness level.

Other switches in the switch matrix 30 are used for example to cause generatation of multi-frequency dialling tones (to be described later). Reproduction of the sound of these tones in receiver 19 or loudspeaker 35 can be inhibited by an application of a signal from microprocessor 23 on bus 24 via latch 25 to switch 17, which opens when these signals are generated, thus cutting off the audio transmission path to amplifier 18.

The outward going form of data signal is applied via bus 22 to UART 21. Here the parallel form of digital signal is changed to serial asynchronous form and is applied to MODEM 20. The output signal of a 32 kilohertz oscillator 36 is applied to MODEM 20, and the data signal from UART 21 is modulated thereon (preferably to 100% modulation). The resulting output signal is applied to the input of amplifier 14 where it is added to the voice signal output from amplifier 13. Both voice and modulated data signals pass through amplifier 14, capacitor 15, polarity guard 16 and are applied to the two-wire subscriber's line 2.

In this manner voice and data signals are generated and used at the telephone set and are applied to a two-wire line, and voice and data signals are received from the same line, the voice signal is reproduced and the data signal is used to cause operation of a display or to generate telephone set control signals.

FIG. 4 is a block diagram of the interface between two-wire subscriber lines carrying voice and data and a processor controlled PABX, such as type SX-200, manufactured by Mitel Corporation of Kanata, Canada.

Tip and ring two-wire lines 2A-2N leading to voice and data telephone sets of the type described with reference to FIG. 3 terminate at subscriber line interface circuits (SLIC) 40A-40N. Each SLIC separates the voice and data by simple filtering, the voice path being low pass filtered and the data being high pass filtered. Voice paths 41-41N are connected from the SLICs to corresponding analog voice path inputs of the switching exchange switching arrays 42A, 42B, 42C, etc. Each of the switching arrays is connected to the main switching exchange bus 43, for operation in a well-known manner.

Data signal transmission and reception lines 44A, 44B . . . 44N are connected between SLICS 40A-40N to a data bus 45. A multiplexer-demultiplexer 46 is connected to data bus 45 via a two-way link. Multiplixer-demultiplexer 46 is also connected via a bus 47 to the main switching exchange bus 43.

The main switching exchange bus is also connected to a UART 48, the output of which is connected to a MODEM 49, which has its output connected to multiplexer-demultiplexer 46.

Incoming data signals, separated in SLIC 40A from the accompanying voice signal, is applied to one lead of data bus 45. The signals from each of the SLICs are similarly applied to different leads of data bus 45. These various signals are received in multiplexer-demultiplexer 46 and are applied to parallel bus 47 from where they are applied to the main PABX (or switching exchange) bus 43. The PABX controller (or an auxiliary controller if desired) decodes the received data signals from bus 43 and generates responsive control signals for transmission to the voice and data telephone set.

The return signals are applied from the main PABX (or switching exchange) bus 43 to UART 48. UART 48 applies a complete signal, preferably a 3-bit address followed by an 8-bit command signal, followed by a 1-bit stop bit in asynchronous serial form to MODEM 49, to which is also applied a 32 kilohertz carrier signal from oscillator 50. The output signal of MODEM 49 is applied through multiplexer-demultiplexer 46 to one of the leads of data bus 45 for application to a particular SLIC, and thus to a particular two-wire line leading to a subscriber's voice and data telephone set. The address portion of the signal is of course used by multiplexer-demultiplexer 46 to select the particular data bus line to which the signal is applied. It is preferred that the SLIC 49 should contain subscriber line characteristic compensation circuitry of a well-known form to optimize the signal characteristics to be transmitted for the particular subscriber's line to be used.

We have thus described generally how data and voice signals are received and transmitted at the switching machine. A detailed description of the preferred embodiment of the invention follows.

Turning now to FIG. 5, the schematic of a SLIC which can be used as any of SLICs 40A-40N is shown. Voice and data signals carried by tip and ring two-wire line 2 pass through high valued balancing input resistors 54 to the inputs of operational amplifier circuit 55. The output signal of amplifier circuit 55 is AC coupled via capacitor 56, the far terminal of which is connected via by-pass resistor 57 to ground. Capacitor 56 and resistor 57 form a high pass filter, removing noise and AC power line signals below approximately 200 hertz.

The filtered signals are then applied to a SALLEN AND KEY low pass filter 58 which rejects signals above approximately 8 KHz. Thus the modulated data signals and its sidebands are rejected, while voice signals are passed. The low pass filtered voice signals are carried through a junctor matching resistor 59 to a junctor lead JNC.

The voice and data signals at the output of capacitor 56 appear on the DATA RX lead, for transmission to the data bus (45 in FIG. 4).

Outwardly destined data signals are received from the data bus on the DATA TX lead and are applied to one input of operational amplifier 60 via a high value input resistor 61. The output of operational amplifier 60 is applied via power amplifying transistor 62 to the tip (or ring) lead via a resistor 63.

The junction of the emitter of transistor 62 and resistor 63 is connected to the input of operational amplifier 55 opposite to that to which resistor 63 is connected, via high valued resistor 64. The other input of operational amplifier 55 is connected to the ring (or tip) lead to which its other input is connected via a high value resistor 65 which is matched to resistor 64, and through a low valued resistor 66 which matches the value of resistor 63. The junction of resistors 65 and 66 is connected to a level shifting circuit 67, which supplies operating battery for the tip and ring leads, and which interfaces the switching exchange in a conventional way. Gain adjusting feedback is provided by a pair of leads 68 and 69, lead 68 being connected to the JNC lead, and through a resistor 70 of the same value as resistor 61 to the inverting input of amplifier 60. Lead 69 is connected from the SALLEN AND KEY filter to the inverting input of operational amplifier 60.

Data signals received from the data bus on the DATA TX lead are amplified in amplifier 60, power amplified in transistor 62 and are applied to one of the leads 2, (tip lead T). Since these signals would be fed back through amplifier 55, they are also applied via resistor 64 to the input of amplifier 55 opposite to that which the tip lead is connected. The data signals to be transmitted to the subscriber's set are thus substantially cancelled. However signals received from the data set are differentially received and are amplified in amplifier 55.

FIGS. 6A-C and 7 considered together show the interface of a plurality of SLIC circuits 74 of the aforenoted kind with a processor controlled switching exchange. Each of the SLIC circuits 74 interface via a DATA TX and a DATA RX lead with a data bus 45, the bus having leads D00-D07 and D10-D17. The junctor lead JNC of each of the SLIC circuits is connected to a junctor bus 75, which is connected to analog switching integrated circuit chips 174, which form an analog switching array in the switching exchange 180 according to well known practice (e.g. as in the Mitel, type SX-200 PABX). Control of the connection of a particular line to the tip and ring leads which are extended to a particular telephone set is handled by the PABX according to its internal programs and services purchased by the subscriber. Power, enabling, etc. are provided to the SLIC circuits via buses 76 in a well known manner.

The input and output data signal leads, D0-D7 and D10-D17 associated with bus 45 are respectively connected to multiplexer-demultiplexers 77 and 78.

A bus interface circuit 79 of a kind usually found in processor controlled switching systems is connected between a main switching machine bus 80 and an auxiliary bus 81. Auxiliary bus 81 can therefore be connected to a bus port 179 which, for example, already exists in the aforenoted Mitel Corporation type SX-200 PABX.

Signals to be transmitted appear as address and data bits on auxiliary bus 81 and pass into a UART 82, where they are converted into serial asynchronous form and are passed into a MODEM 83. Address bits are retained in a latch 84 which is connected to bus 81, from which they are passed into a latch 85. The address bits are applied to an AGC circuit 86 to which a plurality of line attenuation compensation capacitors 87 are connected. Each subscriber station has its own designated capacitor, which compensates its signal due to the effect of different line lengths and required transmission levels. The address retained in latch 85 thus selects one capacitor for the particular selected address.

The address bits also pass into multiplexer-demultiplexers 77 and 78, thus selecting one output data path D00-D07 and one input data path D10-DI7, leading to a particular SLIC. Thus the asynchronous data output from UART 82 passes through MODEM 83 where it is modulated on a 32 KHz carrier and is applied modulated on the carrier signal to one of the output data lines D0-D07. MODEM 83 is shown as a single block, but of course, includes the preferably 32 KHz oscillator.

Data received on one of the leads D10-D17 passes through multiplexer-demultiplexer 78 and is applied to MODEM 83, where it is demodulated and applied to the RRI input of UART 82. UART 82 applies the signal in parallel form to auxiliary bus 81, from where it is received by the switching exchange processor.

FIGS. 8 and 9 form a schematic of the preferred form of voice and data telephone set. A handset microphone input is capacitor coupled via capacitor 100 and input resistor 101 to the inverting input of an operational amplifier 103 which forms a buffer-adder. Preferably the junction of capacitor 100 and resistor 101 is connected to circuit ground through oppositely poled diode array 102 which performs a voltage limiter function. The output of operational amplifier 103 is connected to the non-inverting input of amplifier 103A through a high valued resistor 104. The output of amplifier 103 is connected via a relatively small valued resistor 105 (e.g. 100 ohms) and a large DC blocking capacitor 106 to a polarity guard 107. The polarity guard is connected to the 2 wire subscriber's line tip and ring leads 108. The junction of capacitor 106 and resistor 105 is connected through resistor 109 and an electronic switch 110 to the input of receiver amplifier 111. The output of receiver amplifier 111 is connected to a handset earpiece 112.

A feedback path lead is connected from resistor 109 to the junction of capacitor 100 and resistor 101 through resistor 113.

Voice signals originating at the handset microphone connected to capacitor 100 thus pass through amplifier 103, amplifier 103A, line impedance matching resistor 105, blocking capacitor 106 and polarity guard 107 and are applied to tip and ring leads 108. At the same time the signals pass through resistor 109, switch 110 and amplifier 111 and are reproduced in earpiece 112 as sidetone to the speaking subscriber. Switch 110 corresponds to switch 17 of FIG. 3 and is opened during push button multifrequency dialing due to the high signal levels used, and in case balance is poor.

The signals are also passed through a second electronic switch 114, through voice switching hands free module 115 (if used), volume control potentiometer 116, amplifier 117, power amplifying transistor stage 118, output transformer 119 to loudspeaker 120. Hands free module 115 has been shown merely as a loudspeaking amplifier.

When switch 114 is enabled, the signal passes through hands free module 115 (which can be considered for this purpose as a short circuit) has its amplitude corrected through potentiometer 116, is amplified in amplifier 117 and is applied to speaker 120 to reproduce the voice signal acoustically at room level.

Hands free module 115, if included, should contain circuitry for allowing hands free voice switching of the subject signal and another voice signal, the circuitry thereof not forming a part of this invention.

The junction between resistor 105 and capacitor 106 is connected to a data input of a MODEM 121. MODEM 121 receives voice and data signals from the tip and ring leads 108, high pass filters the signal (eliminating the voice signal) and demodulates the data signal. The resulting baseband digital data signal is applied through a level shifting circuit comprising series resistor 122 (connected to a source of voltage +V through diode 123), to the received input RRI of an UART 124.

Data is received from this set in MODEM 121 in a manner to be described below and passes via lead 125 to the non-inverting input of amplifier 103A through capacitor 126. A feedback loop lead is connected from the junction of resistor 109 and switch 110 through resistor 127 to lead 125.

A preferably 32 kilohertz oscillator 128 is connected via capacitor 129 to the carrier input CA of MODEM 121. Thus data input to MODEM 121 from the telephone set is 100% modulated on the 32 kilohertz carrier, and the modulated carrier is passed via lead 125 into amplifier 123, from which it is passed through capacitor 106 and polarity guard 107 to tip and ring leads 108 for transmission to the switching machine.

Unmodulated data signals can be applied to a modulator or multiplier for multiplying the data signals by the 32 kHz carrier signal to provide a 100% amplitude modulated data signal. This modulated data signal can be applied to a low Q bandpass filter having a center frequency of 32 kHz. Unwanted sideband components are thus eliminated in the bandpass filter. In a preferred embodiment of the invention, Q equals 2.5. Modulated carrier signals applied to MODEM 121 can be applied to a second bandpass filter having similar characteristics as the other one of the bandpass filters. Signals appearing at the output of the second bandpass filter can be passed through an envelope detector and applied to a ½ peak detector having a very long time constant relative to the digital signal bit rate, and a preferred gain of ½. Output signals from the ½ peak detector and the envelope detector can be applied to separate inputs of a comparator, whereby the output of the ½ peak detector sets a sensitivity threshold for the operation of the comparator.

A data bus 139 comprising leads D0–D7 connects a portion of this circuit to a micrprocessor, as will be described below. An 8-bit latch 130 has its input leads connected to the data bus and its output leads connected to the input terminals of a DTMF tone generator 131. With the reception of an appropriate data signal, latched in latch 130, dialing tones of well known standard frequencies are generated, and appear at the TONE output lead. The DTMF signal appearing thereat is applied through capacitor 132 and resistor 133 to the input of amplifier 103 and through capacitor 132 and high value resistor 134 to the input of amplifier 111. Thus as in the case of switch 110 being open-circuited, a small amount of sidetone is passed through resistor 134 to earpiece 112.

The data bus 139 is also connected to an 8-bit latch 135. The output terminals of latch 135 are connected to a level shifting circuit 136 of conventional construction, the output terminals of which are connected to the enable inputs of control points in the subject telephone set, e.g. to switches 110 and 114, etc. The data to be transmitted to the switching machine also is passed through latch 135 and level shifting circuit 136, as do the signals which control the UART 124.

The parallel input and output data terminals of UART 124 are also connected to data bus leads D0–D7. In addition, interrupt, enable, etc. leads are connected in a conventional manner from UART 124 to a microprocessor, as will be described below.

A microprocessor 140, which includes an LCD controller (such as NEC type 7503) preferably of CMOS form interfaces the bus leads are described above. Bus leads D0–D7, latch enable leads L1 and L0, TBRL, RRD, clock and reset, in a well known manner. The microprocessor also interfaces an LCD display 141, as well as a main LCD display 142 through a dot matrix 8-character LCD controller 143. An auxiliary controller 143 is used since the controller contained in microprocessor 140 is insufficient to operate a large alphanumeric character display containing e.g. 28 characters, as well as display 141. The driver voltages for the controller 143 are obtained in a conventional and well known way.

A push-button array comprised of switches 144 arranged in a matrix has its column leads connected via diodes 145 to the output of a pair of 8-bit latches 146, which have their inputs connected to the bus leads D0–D7. The row leads are connected to the P1 interupt inputs 0–3 of the microprocessor. Each of the row leads is connected to one input of NAND gate 147, the output of which is connected to an interrupt input INT1 of the microprocessor.

A tone ringer 137 has its output connected through apotentiometer 138 to the input of amplifier 117. Tone ringer 137 is connected through one of the outputs of latch 135 through level shifter 136. Thus upon being enabled via a signal from the microprocessor on the data bus, the tone ringer operates, outputting a signal which is heard through loudspeaker 120.

In this telephone set, certain of the switches 144 are grouped for various functions, such as in a keyboard 148, in a dialing digit array, and for control or request for service. For example, microprocessor 140, scanning the switches in a well known manner, would determine that, for example, a particular dialing push-button is closed. The microprocessor then generates a parallel digital code which is latched in latch 130, causing operation of a particular multi-frequency signal to be generated and applied to the tip and ring leads as described earlier. After reception and decoding at the switching exchange, a return signal would be demodulated in MODEM 121, placed into parallel form in UART 144 on the data bus D0–D7 in the telephone set, and be received by microprocessor 140. In response microprocessor 140 would cause an LCD display to show a particular digit, designating a particular dialed digit (resulting in the eventual display of the complete dialed number) and/or might cause the display to operate a label associated with one of the control switches as having a particular control function, e.g. indicating which of a group of lines is in use, designating a switch to have the facility of control of a particular function, such as "hold" etc.

Operation of any of the keyboard or other switches 144 would similarly cause the microprocessor to generate an output data signal which passes through latch 135, level shifter 136, MODEM 121 and as a modulated data signal to the tip and ring leads as described earlier, along with any voice signal which may be carried at the same time. Alternatively, the signal applied to the bus, latched in latch 135 and shifted in level shifter 136 would enable or inhibit switches 110 and 114, operate the handsfree module 115, etc.

The present invention thus provides a facility for the first time of connecting a voice and data telephone set to a central exchange via two communication wires, the set having the operation appearance of numerous lines available, having a display, a keyboard, control switches and DTMF dialing pushbuttons, the voice and data signals being passed simultaneously with reliability, and without interference.

A person skilled in the art understanding this invention may now conceive of variations or other embodiments. All are considered to be within the sphere and scope of this invention as defined in the claims appended hereto.

I claim:

1. A bidirectional two wire combined voice and data transmission system comprising:
    (a) a telephone switching exchange including voice signal switching means and a bus system to which a switching exchange controller is connected, the voice signal switching means having a defined audio frequency transmission bandwidth,
    (b) one or more subscribers' sets for generating audio frequency analog signals for transmission to the switching exchange,
    (c) means associated with each subscriber's set for generating serial digital signals for transmission to said switching exhcange,
    (d) means for amplitude modulating a carrier signal with said digital signals, the carrier signal being at a frequency higher than the upper limit of said defined bandwidth, and at least twice the highest frequency of said analog signals,
    (e) means for combining the modulated digital signals and said analog signals,
    (f) one or more two wire subscribers' lines interconnecting the subscribers' sets and said switching exchange,
    (g) means for applying the combined signals to one end of each of the subscribers' lines, (h) means for receiving the combined signals at the switching exchange, including multiplexing and demodulating means for reconstructing the digital signals, and applying them to said bus system, and including means for filtering the analog signals and applying them to the voice signal switching means.

2. A two wire combined voice and data transmission system as defined in claim 1, further including:
(a) means at the subscriber's set for audibly reproducing an audio frequency signal received from the subscriber's line,
(b) remotely operated control circuitry at said subscriber's set,
(c) means for receiving a combined audio signal and a serial digital signal modulated on a carrier signal which carrier signal has a frequency higher than the upper limit of said defined bandwidth and at least twice the highest frequency of said audio frequency signal,
(d) means at the subscriber's set for demodulating the modulated digital signal and for reconstructing the received digital signal,
(e) means for applying the reconstructed received digital signal to the control circuitry, and
(f) means for applying the received audio frequency signal to the reproducing means.

3. A two-wire combined voice and data transmission system as defined in claim 2 further including a display, the control circuit including means for driving the display in response to predetermined received digital signals, at least one remotely controlled operation circuit, said control circuit including means for controlling said operation circuit.

4. A two-wire combined voice and data transmission system as defined in claim 3, in which said operation circuit is comprised of a ringing tone oscillator, an amplifier connected to the oscillator, a ringing tone reproducing means connected to the amplifier and a first switch for applying ringing tone signals from the oscillator to the tone reproducing means via the amplifier, and means for applying an enable signal from the control circuit to said switch, whereby an audible ringing tone is emitted from the tone reproducing means upon enabling by the control circuit following reception of predetermined digital signals on the subscriber's line.

5. A two-wire combined voice and data transmission system as defined in claim 3 or 4, further including a plurality of manually operated local control switches, means for applying local control signals to the control circuit upon operation of the local control switches, the control circuit including means for generating said digital signals for modulation on said first carrier signal in response to reception of the local control signals.

6. A bidirectional two-wire combined voice and data transmission system for subscribers' sets comprising:
(a) one or more subscribers' sets adapted to generate and to receive baseband voice signals and data signals via a two-wire bidirectional link,
(b) means for amplitude modulating the generated data signals on one or more carrier signals having their lowest filtered sidebands above the voice signal baseband,
(c) means for applying said voice signals and modulated carrier together on one or more two-wire subscribers' lines connected to respective ones of the subscribers' sets,
(d) means at a switching exchange for separating the voice signals and modulated carrier signals, and for applying the voice signals to voice signal switching paths of the switching exchange, and
(e) means for multiplexing and demodulating the data signals and applying the demodulated data signals to control circuits of the switching exchange.

7. A combined voice and data transmission system as defined in claim 6, further including means at the subscriber's set for separating voice signals and digitally modulated carrier signals received from the two-wire subscriber's line and for acoustically reproducing said voice signal at the subscriber's set, means for demodulating the digitally modulated carrier signal received from the two-wire subscriber's line and for generating subscriber's set function control signals in response thereto.

8. A bidirectional two-wire combined voice and data transmission system as defined in claim 6, wherein at least one of said subscribers' sets is comprised of:
(a) means for generating audio frequency analog signals for transmission via a two-wire subscriber's line to a switching machine which has a defined audio frequency transmission bandwidth,
(b) means for generating serial digital signals for transmission via said two-wire line to said switching machine,
(c) means for amplitude modulating the digital signals on a first carrier signal having a frequency higher than the upper limit of said defined bandwidth, and at least twice the highest frequency of said analog signals, and
(d) means for combining the modulated digital signals and said analog signals and applying them to said subscriber's line.

9. A subscriber's set as defined in claim 8, further including:
(a) a control circuit,
(b) means for receiving a combined audio signal and a serial digital signal amplitude modulated on a second carrier signal having a frequency higher than the upper limit of said defined bandwidth and at least twice the highest frequency of said audio frequency signal,
(c) means for demodulating the modulated digital signal and for reconstructing the received digital signal,
(d) means for applying the reconstructed received digital signal to the control circuit,
(e) means for acoustically reproducing a received audio frequency signal from the subscriber's line, and
(f) means for applying the received audio frequency signal to the reproducing means.

10. A subscriber's set as defined in claim 9, further including a display, the control circuit including means for driving the display in response to predetermined received digital signals, at least one remotely controlled operation circuit, said control circuit including means for controlling said operation circuit.

11. A subscriber's set as defined in claim 10 in which said operation circuit is comprised of a ringing tone oscillator, an amplifier connected to the oscillator, a ringing tone reproducing means connected to the amplifier and a first switch for applying ringing tone signals from the oscillator to the tone reproducing means via the amplifier, and means for applying an enable signal from the control circuit to said switch, whereby an audible ringing tone is emitted from the tone reproducing means upon enabling by the control circuit following reception of predetermined digital signals on the subscriber's line.

12. A subscriber's set as defined in claim 10 or 11, further including a plurality of manually operated local control switches, means for applying local control signals to the control circuit upon operation of the local control switches, the control circuit including means for generating said digital signals for modulation on said first carrier signal in response to reception of the local control signals.

13. In a bidirectional two-wire combined voice and data transmission system, as defined in claim 6, a subscriber's set comprising:

(a) a handset including a microphone for generating audio frequency signals and an earpiece for reproducing audio frequency signals, (b) subscriber's line terminals for connecting the subscriber's set to a tip lead and a ring lead, (c) a first buffer amplifier having its input connected to the microphone, (d) a second amplifier having its input connected to the output of said first amplifier, (e) means for a.c. coupling the output of the second amplifier to the subscriber's line, (f) means for coupling a first fraction of the audio frequency signals at the output of the microphone to a third amplifier to provide a sidetone signal corresponding to said audio frequency signals, the output of the third amplifier being connected to the earpiece, (g) means for a.c. coupling the subscriber's line terminals to the input of the third amplifier;

(h) a source of serial digital signals, (i) a source of carrier signals, having a frequency at least twice the highest audio signal frequency generated from the microphone, (j) means for amplitude modulating the digital signals on said carrier signals, (k) means for applying the modulated carrier signals to the input of the second amplifier, (l) means a.c. coupled to the subscriber's line terminals for demodulating modulated carrier signals carried thereby;

(m) control means for receiving the demodulated signals for generating function signals for controlling operation functions associated with said subscriber's set.

14. A subscriber's set as defined in claim 13, further comprising a first switch means connected in series circuit with said means for a.c. coupling the subscriber's line terminals to the input of the third amplifier, and means for applying a predetermined function control signal to the switch means whereby it can be switched off during reception of the modulated carrier signal at the subscriber's line terminals.

15. A subscriber's set as defined in claim 13, further including an alphanumeric display, means for applying said function control signals to said display for displaying alphanumeric characters corresponding to said serial data signals from said source of digital signals or received at said subscriber's line terminals.

16. A subscriber's set as defined in claim 13, in which said source of digital signals includes a plurality of manually operated switches and means connected to said latter switches for generating predetermined serial digital signals corresponding to operation of each of said manually operated switches.

17. A subscriber's set as defined in claim 13, in which said source of serial digital signals includes a plurality of manually operated switches and means connected to said latter switches for generating predetermined serial digital signals corresponding to operation of each of said manually operated switches; an alphanumeric display, means for applying said function control signals for displaying alphanumeric characters corresponding to said serial data signals from said source of digital signals or received from said subscriber's line terminals; first switch means connected in series circuit with said means for a.c. coupling the subscriber's line terminals to the input of the third amplifier, and means for applying a predetermined function control signal to the switch means whereby it can be switched off during non-handsfree operation of the subscriber's set.

18. A subscriber's set as defined in claim 17, in which the control means is comprised of a microprocessor-display controller, said display and said plurality of switches being connected thereto.

19. A subscriber's set as defined in claim 14 in which said subscriber terminals are connected via a polarity guard in series with a capacitor to the output of the second amplifier and through a resistor which has very high resistance relative to the output impedance of the second amplifier to the input of said switch means, and means for coupling a second fraction of the audio frequency signals at the output of the microphone to the input to said switch means, said second fraction being sufficient to at least approximately cancel the output signal of the second amplifier appearing at the input to said switch means.

20. A subscriber's set as defined in claim 1, 14 or 19 including a ringing tone oscillator, a speaker, and a second switch means in a circuit coupling the oscillator with the speaker, and means for applying a ringing function control signal from the control means to the second switch means to enable it closed and thus cause audible ringing tone to be reproduced by said speaker.

21. A subscriber's set as defined in claim 14 in which said subscriber terminals are connected via a polarity guard in series with a capacitor to the output of the second amplifier and through a resistor which has very high resistance relative to the output impedance of the second amplifier to the input of said switch means, and means for coupling a second fraction of the audio frequency signals at the output of the microphone to the input to said switch means, said second fraction being sufficient to at least approximately cancel the output signal of the second amplifier appearing at the input to said switch means, a third switch means having its input connected to the output of the third amplifier, and a fourth amplifier connected to the output of the third switch means, having its ouput connected to the speaker, and means for applying a loudspeaking function control signal from the control means to the third switch means to enable it closed and cause audible reproduction of audio frequency signals received from the subscriber's line terminals to be acoustically reproduced by said speaker.

22. A subscriber's set as defined in claim 13, 14 or 16, in which said source of carrier signals is an oscillator for generating a carrier signal at about 32 kilohertz.

23. A subscriber's set as defined in claim 13, 14 or 16, in which said source of carrier signals is an oscillator for generating a carrier signal at about 32 kilohertz, and in which the means for modulating is comprised of a multiplier for multiplying the serial digital signals and the modulated carrier signals, followed by a low Q bandpass filter having a center frequency at said carrier frequency.

24. A subscriber's set as defined in claim 13, 14 or 16, in which said source of carrier signals is an oscillator for generating a carrier signal at about 32 kilohertz, and in which the means for modulating is comprised of an multiplier for multiplying the serial digital signals and the modulated carrier signals, followed by a bandpass filter having a Q of about 2.5 and having a center frequency at said carrier frequency.

25. A subscriber's set as defined in claim 13, 14 or 16, in which the frequency of the carrier signals received from and applied to said subscriber's line terminals are the same, and in which the demodulating means is comprised of a low Q bandpass filter having a center frequency at the carrier frequency, an envelope detector having its input connected to the output of the bandpass filter, a ½ peak detector having a long time constant relative to the digital signal bit rate connected to the output of the envelope detector, and a comparator having one input connected to the output of the envelope detector and its other input connected to the output of the ½ peak detector.

26. A subscriber's set as defined in claim 13, 14 or 16, in which the frequency of the carrier signals received from and applied to said subscriber's line terminals are the same, and in which the demodulating means is comprised of a bandpass filter having a Q of about 2.5 and having a center frequency at the carrier frequency, an envelope detector having its input connected to the output of the bandpass filter, a ½ peak detector having a long time constant relative to the digital signal bit rate connected to the output of the envelope detector, and a comparator having one input connected to the output of the envelope detector and its other input connected to the output of the ½ peak detector.

27. A method of transmitting both voice and data signals simultaneously over two-wire bidirectional subscribers' lines comprising:
   (a) receiving one or more voice signals from one or more subscribers' sets,
   (b) 100% amplitude modulating one or more serial digital signals on one or more carrier signals which are at least twice the highest frequency of the voice signals,
   (c) combining respective ones of the voice signals and modulated digital signals,
   (d) applying the combined signals to first ends of a respective one or more subscribers' lines, for reception at opposite ends of the subscribers' lines,
   (e) separating the combined received voice and digital signals,
   (f) applying the separated voice signals to respective voice signal switching paths of a switching exchange, and
   (g) multiplexing the separated digital signals, demodulating the multiplexed digital signals and applying the multiplexed demodulated digital signals to control circuits of the switching exchange.

* * * * *

UNITED STATES PATENT AND TRADEMARK OFFICE
CERTIFICATE OF CORRECTION

PATENT NO. : 4,608,686

DATED : August 26, 1986

INVENTOR(S) : Barsellotti

It is certified that error appears in the above-identified patent and that said Letters Patent is hereby corrected as shown below:

Replace claim 1 with the following claim:

1. A bidirectional two wire combined voice and data transmission system comprising:
   (a) a telephone switching exchange including voice signal switching means and a bus system to which a switching exchange controller is connected, the voice signal switching means having a defined audio frequency transmission bandwidth,
   (b) a plurality of subscribers' sets for generating audio frequency analog signals for transmission to the switching exchange,
   (c) means associated with each subscriber's set for generating serial digital signals for transmission to said switching exchange,
   (d) means for amplitude modulating a carrier signal with said digital signals, the carrier signal being at a frequency higher than the upper limit of said defined bandwidth, and at least twice the highest frequency of said analog signals,
   (e) means for combining the modulated digital signals and said analog signals for each subscriber set,
   (f) a plurality of two wire subscribers' lines interconnecting respective subscribers' sets and said switching exchange,
   (g) means for applying the combined signals from each subscribers' set to one end of a respective one of the subscribers' lines,
   (h) means for receiving the combined signals at the switching exchange, including filtering means for separating the analog signals from the digital signals and for applying said analog signals to the voice signal switching means, multiplexing means for multiplexing the digital signals received from said plural subscribers' lines and for demodulating the multiplex signals, and means for reconstructing the demodulated digital signals and for applying them to said bus system.

UNITED STATES PATENT AND TRADEMARK OFFICE
CERTIFICATE OF CORRECTION

PATENT NO. : 4,608,686

DATED : August 26, 1986

INVENTOR(S) : Barsellotti

It is certified that error appears in the above-identified patent and that said Letters Patent is hereby corrected as shown below:

Claim 2, column 13, line 12, after "(b)", insert --a--;
line 12, delete "circuitry", insert --circuit--
line 15, after "signal", first occurrence insert --amplitude--
line 24, delete "circuitry", insert --circuit--.
Claim 3, column 13, line 28, after "including", insert --at said subscriber's set--.
Claim 5, column 13, line 47, after "including", insert --at said subscriber's set--.

Replace claim 6 with the following claim:

6. A bidirectional two-wire combined voice and data transmission system for subscribers' set comprising:
  (a) a plurality of subscribers' sets each adapted to generate and to receive baseband voice signals and data signals via a two-wire bidirectional link,
  (b) means for amplitude modulating the generated data signals on one or more carrier signals having their lowest filtered sidebands above the voice signal baseband,
  (c) means for applying said voice signals and modulated carrier together on one or more two-wire subscribers' lines connected to respective ones of the subscribers' sets,
  (d) means at a switching exchange for separating the voice signals and modulated carrier signals received via said subscribers' lines, and for applying the voice signals to voice signal switching paths of the switching exchange, and

UNITED STATES PATENT AND TRADEMARK OFFICE
CERTIFICATE OF CORRECTION

PATENT NO. : 4,608,686       Page 3 of 3

DATED : August 26, 1986

INVENTOR(S) : Barsellotti

It is certified that error appears in the above-identified patent and that said Letters Patent is hereby corrected as shown below:

```
   (e)   means for multiplexing the data signals received via said
plurality of subscribers' lines and for subsequently demodulating
the multiplexed data signals and applying the demodulated data
signals to control circuits of the switching exchange.
```

Signed and Sealed this

Eleventh Day of August, 1987

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : 4,608,686

DATED : August 26, 1986

INVENTOR(S) : Barsellotti

It is certified that error appears in the above-identified patent and that said Letters Patent is hereby corrected as shown below:

Replace claim 1 with the following claim:

1. A bidirectional two wire combined voice and data transmission system comprising:
   (a) a telephone switching exchange including voice signal switching means and a bus system to which a switching exchange controller is connected, the voice signal switching means having a defined audio frequency transmission bandwidth,
   (b) a plurality of subscribers' sets for generating audio frequency analog signals for transmission to the switching exchange,
   (c) means associated with each subscriber's set for generating serial digital signals for transmission to said switching exchange,
   (d) means for amplitude modulating a carrier signal with said digital signals, the carrier signal being at a frequency higher than the upper limit of said defined bandwidth, and at least twice the highest frequency of said analog signals,
   (e) means for combining the modulated digital signals and said analog signals for each subscriber set,
   (f) a plurality of two wire subscribers' lines interconnectin respective subscribers' sets and said switching exchange,
   (g) means for applying the combined signals from each subscribers' set to one end of a respective one of the subscribers' lines,
   (h) means for receiving the combined signals at the switching exchange, including filtering means for separating the analog signals from the digital signals and for applying said analog signals to the voice signal switching means, multiplexing means for multiplexing the digital signals received from said plural subscribers' lines and for demodulating the multiplexed signals and means for reconstructing the demodulated digital signals and for applying them to said bus system.

UNITED STATES PATENT AND TRADEMARK OFFICE
CERTIFICATE OF CORRECTION

PATENT NO. : 4,608,686

DATED : August 26, 1986

INVENTOR(S) : Barsellotti

It is certified that error appears in the above-identified patent and that said Letters Patent is hereby corrected as shown below:

Claim 2, column 13, line 12, after "(b)", insert --a--;
line 12, delete "circuitry", insert --circuit--
line 15, after "signal", first occurrence insert --amplitude--
line 24, delete "circuitry", insert --circuit--.

Claim 3, column 13, line 28, after "including", insert --at said subscriber's set--.

Claim 5, column 13, line 47, after "including", insert --at said subscriber's set--.

Replace claim 6 with the following claim:

6. A bidirectional two-wire combined voice and data transmission system for subscribers' sets comprising:
(a) a plurality of subscribers' sets each adapted to generate and to receive baseband voice signals and data signals via a two-wire bidirectional link,
(b) means for amplitude modulating the generated data signals on one or more carrier signals having their lowest filtered sidebands above the voice signal baseband,
(c) means for applying said voice signals and modulated carrier together on one or more two-wire subscribers' lines connected to respective ones of the subscribers' sets,
(d) means at a switching exchange for separating the voice signals and modulated carrier signals received via said subscribers' lines, and for applying the voice signals to voice signal switching paths of the switching exchange, and

UNITED STATES PATENT AND TRADEMARK OFFICE
CERTIFICATE OF CORRECTION

PATENT NO. : 4,608,686

DATED : August 26, 1986

INVENTOR(S) : Barsellotti

It is certified that error appears in the above-identified patent and that said Letters Patent is hereby corrected as shown below:

```
   (e)  means for multiplexing the data signals received via said
plurality of subscribers' lines and for subsequently demodulating
the multiplexed data signals and applying the demodulated data
signals to control circuits of the switching exchange.
```

This certificate supersedes Certificate of Correction issued August 11, 1987.

Signed and Sealed this

First Day of March, 1988

Attest:

DONALD J. QUIGG

Attesting Officer

Commissioner of Patents and Trademarks